United States Patent
Briggance

(10) Patent No.: US 10,384,611 B2
(45) Date of Patent: *Aug. 20, 2019

(54) VEHICLE VISION SYSTEM WITH REAR MOUNTED CAMERA

(71) Applicant: MAGNA ELECTRONICS INC., Auburn Hills, MI (US)

(72) Inventor: William G. Briggance, Grand Rapids, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/984,491

(22) Filed: May 21, 2018

(65) Prior Publication Data
US 2018/0265003 A1    Sep. 20, 2018

Related U.S. Application Data

(60) Division of application No. 14/251,843, filed on Apr. 14, 2014, now Pat. No. 9,975,484, which is a continuation of application No. 11/672,070, filed on Feb. 7, 2007, now Pat. No. 8,698,894.

(60) Provisional application No. 60/765,797, filed on Feb. 7, 2006.

(51) Int. Cl.
| | |
|---|---|
| *H04N 7/18* | (2006.01) |
| *B60R 1/00* | (2006.01) |
| *B60R 11/04* | (2006.01) |
| *B60R 13/00* | (2006.01) |
| *H04N 5/374* | (2011.01) |
| *B60R 11/00* | (2006.01) |

(52) U.S. Cl.
CPC ............... *B60R 1/00* (2013.01); *B60R 11/04* (2013.01); *B60R 13/005* (2013.01); *H04N 5/374* (2013.01); *B60R 2011/004* (2013.01); *B60R 2300/10* (2013.01); *B60R 2300/802* (2013.01)

(58) Field of Classification Search
CPC ........................................................ B60R 1/00
See application file for complete search history.

(56) References Cited

U.S. PATENT DOCUMENTS

| | | |
|---|---|---|
| 4,264,144 A | 4/1981 | McCord |
| 5,121,200 A | 6/1992 | Choi |
| 5,533,306 A | 7/1996 | Aspenson |
| 5,550,677 A | 8/1996 | Schofield et al. |
| 5,574,443 A | 11/1996 | Hsieh |
| 5,670,935 A | 9/1997 | Schofield et al. |
| 5,680,123 A | 10/1997 | Lee |

(Continued)

*Primary Examiner* — Hua Fan
(74) *Attorney, Agent, or Firm* — Honigman LLP

(57) ABSTRACT

A vehicle vision system includes an extender element disposed at a rear portion of a vehicle. The extender element includes an extender portion and an end portion, with the end portion viewable to a viewer who is viewing the rear of the vehicle. The end portion includes at least one of (i) a vehicle emblem and (ii) a vehicle logo. A rear backup camera assembly is at least partially disposed in the extender portion of the extender element. The rear backup camera assembly is disposed with its lens viewing exterior of the vehicle. The extender element is incapable of extending such that the rear backup camera is non-movable relative to the rear portion of the vehicle when disposed at the rear portion of the vehicle.

17 Claims, 7 Drawing Sheets

(56) References Cited

U.S. PATENT DOCUMENTS

| | | |
|---|---|---|
| 5,760,826 A | 6/1998 | Nayar |
| 5,796,094 A | 8/1998 | Schofield et al. |
| 5,877,897 A | 3/1999 | Schofield et al. |
| 6,097,023 A | 8/2000 | Schofield et al. |
| 6,115,651 A | 9/2000 | Cruz |
| 6,175,300 B1 | 1/2001 | Kendrick |
| 6,201,642 B1 | 3/2001 | Bos |
| 6,226,035 B1 | 5/2001 | Korein et al. |
| 6,265,984 B1 | 7/2001 | Molinaroli |
| 6,304,285 B1 | 10/2001 | Geng |
| 6,313,454 B1 | 11/2001 | Bos et al. |
| 6,353,392 B1 | 3/2002 | Schofield et al. |
| 6,396,397 B1 | 5/2002 | Bos et al. |
| 6,470,273 B2 | 10/2002 | Halsted et al. |
| 6,498,620 B2 | 12/2002 | Schofield et al. |
| 6,509,832 B1 | 1/2003 | Bauer et al. |
| 6,538,827 B2 | 3/2003 | Bos |
| 6,593,848 B1 | 7/2003 | Atkins, III |
| 6,614,358 B1 | 9/2003 | Hutchison et al. |
| 6,690,268 B2 | 2/2004 | Schofield et al. |
| 6,693,518 B2 | 2/2004 | Kumata et al. |
| 6,717,610 B1 | 4/2004 | Bos et al. |
| 6,738,089 B1 | 5/2004 | Silc |
| 6,757,109 B2 | 6/2004 | Bos |
| 6,760,989 B2 | 7/2004 | Peterson et al. |
| 6,833,822 B2 | 12/2004 | Klocek et al. |
| 6,856,873 B2 | 2/2005 | Breed et al. |
| 6,989,736 B2 | 1/2006 | Berberich et al. |
| 7,005,974 B2 | 2/2006 | McMahon et al. |
| 7,006,303 B2 | 2/2006 | Imoto |
| 7,253,833 B2 | 8/2007 | Imoto |
| 7,359,001 B2 | 4/2008 | Imoto |
| 7,502,048 B2 | 3/2009 | Okamoto et al. |
| 7,579,940 B2 | 8/2009 | Schofield et al. |
| 7,726,434 B2 | 6/2010 | Pochmuller |
| 7,881,496 B2 | 2/2011 | Camilleri |
| 7,940,301 B2 | 5/2011 | Kinoshita |
| 7,965,336 B2 | 6/2011 | Bingle et al. |
| 8,665,331 B2 | 3/2014 | Onaka |
| 8,698,894 B2 | 4/2014 | Briggance |
| 9,975,484 B2 | 5/2018 | Briggance |
| 2002/0122218 A1* | 9/2002 | TeWinkle .............. H04N 1/40 358/514 |
| 2003/0141972 A1 | 7/2003 | Yang et al. |
| 2004/0145457 A1* | 7/2004 | Schofield .............. B60C 23/00 340/425.5 |
| 2006/0050018 A1 | 3/2006 | Hutzel et al. |
| 2006/0164230 A1 | 7/2006 | DeWind et al. |
| 2006/0171704 A1 | 8/2006 | Bingle et al. |
| 2007/0182817 A1 | 8/2007 | Briggance |
| 2007/0263090 A1 | 11/2007 | Abe |
| 2008/0266389 A1 | 10/2008 | De Wind |

* cited by examiner

VEHICLE VISION SYSTEM WITH REAR MOUNTED CAMERA

CROSS REFERENCE TO RELATED APPLICATIONS

The present application is a division of U.S. patent application Ser. No. 14/251,843, filed Apr. 14, 2014, now U.S. Pat. No. 9,975,484, which is a continuation of U.S. patent application Ser. No. 11/672,070, filed Feb. 7, 2007, now U.S. Pat. No. 8,698,894, which claims benefit of U.S. provisional application Ser. No. 60/765,797, filed Feb. 7, 2006, which is hereby incorporated herein by reference in its entirety.

FIELD OF THE INVENTION

The present invention relates to imaging systems for vehicles and, more particularly, to rear vision systems or back up aids for vehicles.

BACKGROUND OF THE INVENTION

It is known to provide a rearward facing camera or imaging sensor or device at a rear of a vehicle and with a generally rearward and downward field of view to capture images of the area immediately rearward of the vehicle for a rear vision system or back up aid system or the like. Examples of such rear vision devices and systems are described in U.S. Pat. Nos. 7,005,974; 6,989,736; 6,757,109; 6,717,610; 6,396,397; 6,201,642; 6,353,392; 6,313,454; 5,550,677; 5,670,935; 5,796,094; 5,877,897; 6,097,023; and 6,498,620, and International Publication No. WO 2004/047421, published Jun. 3, 2004, which are all hereby incorporated herein by reference in their entireties. Such devices and systems perform adequately for their particular applications.

It has been suggested that such imaging devices be located at the license plate well or under the sill or overhang portion at the license plate well or recess, such as, for example, as is common on tail gates or lift gates of SUVs, minivans or the like. However, it is desirable that such rearward and substantially downward facing imaging devices be generally centrally located at the rear of the vehicle, and many vehicles have a trunk or lift gate release handle at the central region of the sill or overhang portion, such that an imaging device cannot be centrally located at the recess or well of the rear license plate. It has been suggested to incorporate an imaging device in an extendable/retractable device so that the imaging device may extend or be moved outward or rearward when it is desired to capture images so as to provide an enhanced rearward and downward field of view for the imaging device when so extended, and may retract within or partially within the rear portion of the vehicle when not in use. Such devices are typically costly and complicated devices and have not yet achieved widespread commercialization.

Therefore, there is a need in the art for an improved rear imaging system that overcomes the shortcomings of the prior art.

SUMMARY OF THE INVENTION

The present invention provides an imaging system with an imaging device at a rear portion of the vehicle and directed to have a generally rearward and downward field of view. The imaging device is located at a decal or indicia of the vehicle, such as at a rear tail gate or deck lid handle or the like, and may be located rearward of the rear surface of the tail gate or deck lid so as to provide a generally rearward and downward field of view. The imaging device or camera is thus camouflaged or rendered covert or covertly located by utilizing the exterior trim elements of the vehicle that are readily accessible and that may be modified or extended to accommodate the imaging device or camera.

According to an aspect of the present invention, a rear vision system for a vehicle includes an image processing device, a display device and an imaging device or sensor or camera. The imaging device is located at a rear portion of the vehicle and has a generally rearward and substantially downward field of view for capturing images of the area substantially immediately rearward of the vehicle. The imaging device is positioned at least partially within an extender element that extends from a rear surface of the vehicle. A vehicle emblem or decal or exterior trim component is attached to or included as part of the outer or rearward end or surface of the extender element so that the extender element is not readily noticeable or discernible by a person viewing the rear of the vehicle.

The extender element and imaging device may be installed to the rear of the vehicle during manufacture of the vehicle. Optionally, the decal or emblem or exterior trim component of an existing vehicle may be removed from the rear portion of the vehicle, and the extender element and imaging device may be attached to the rear portion as an aftermarket device. The decal or emblem may be reattached to or replaced at the outer or rearward end or surface of the extender element, or a new decal or emblem may be included as part of the extender element.

According to another aspect of the present invention, a vehicle vision system includes a vehicle having a body surface and a vehicle element generally at the body surface. The vehicle element defines at least one of a styling feature and a functional feature of the vehicle and has a normal distance dimension relative to the body surface of the vehicle. An imaging device has an exterior field of view generally exterior of the vehicle, and captures images of a region external of the vehicle. An extender element at the body surface extends outwardly therefrom, with the vehicle element being disposed at an outer surface of the extender element. The extender element extends the normal distance dimension of the vehicle element for accommodating the imaging device. The imaging device is disposed at least partially within the extender element, whereby the presence of the imaging device in the extender element is at least partially masked or camouflaged by the extender element and the vehicle element. The vehicle vision system includes a display device for displaying video images captured by the imaging device.

Optionally, the body surface is at a rear portion of the vehicle, and the imaging device may have a generally rearward and downward field of view, whereby the imaging device captures images of the area substantially immediately rearward of the vehicle. Optionally, the display device may display images of the rearward and downward field of view in response to the vehicle being shifted into a reverse gear.

Optionally, the extender element may be fixedly attached at body surface or the rear portion of the vehicle. Optionally, and desirably, the extender element may have a surface finish that substantially matches a surface finish of the body surface of the vehicle. Optionally, the vehicle element may be adhesively attached to the outer surface of the extender element.

Optionally, the vehicle element may comprise at least one of (i) a vehicle emblem, (ii) a vehicle decal, (iii) a vehicle indicia, (iv) an exterior trim element of the vehicle, (v) a rear tail gate handle or latch portion, (vi) a deck lid handle or latch portion, and (vii) a light bar element of the vehicle. Optionally, the vehicle element may comprise a vehicle emblem, and the extender element may be shaped to substantially match a shape of the vehicle emblem so that the vehicle emblem substantially encompasses the outer surface of the extender element.

Optionally, the imaging device may comprise a pixelated imaging array having a plurality of light sensing photosensor pixels or elements, such as a two dimensional array of light sensing photosensor elements arranged on a semiconductor substrate. The imaging device may comprise a monochromatic imaging device or a black and white imaging device or a color imaging device. Optionally, the imaging device may comprise a CMOS imaging device and/or a color CMOS imaging device.

Therefore, the present invention provides an imaging device for a vehicle that may be positionable at a generally central location of a rear portion of a vehicle, and that may provide a generally downward and rearward field of view at the rear of the vehicle. The imaging device is proud of or positioned outward from a rear portion of the vehicle so that the downward field of view encompasses a portion of the rear of the vehicle, such as a vehicle bumper or the like. The imaging device may be fixedly positioned at the body surface or rear of the vehicle and thus the imaging system does not include costly and complex mechanical devices for extending and retracting the imaging device. The imaging device is positioned within an extender element that is substantially hidden or not readily noticeable or discernible by a person viewing the rear of the vehicle, so that the present invention provides a substantially concealed imaging device at a central region of the rear of the vehicle. A vehicle element, such as a functional element or a styling element, such as an exterior trim element or emblem or the like, is disposed at or attached to an outer surface of the extender element to substantially conceal or render covert the extender element and imaging device.

These and other objects, advantages, purposes and features of the present invention will become apparent upon review of the following specification in conjunction with the drawings.

DESCRIPTION OF THE PREFERRED EMBODIMENTS

Figure 1:
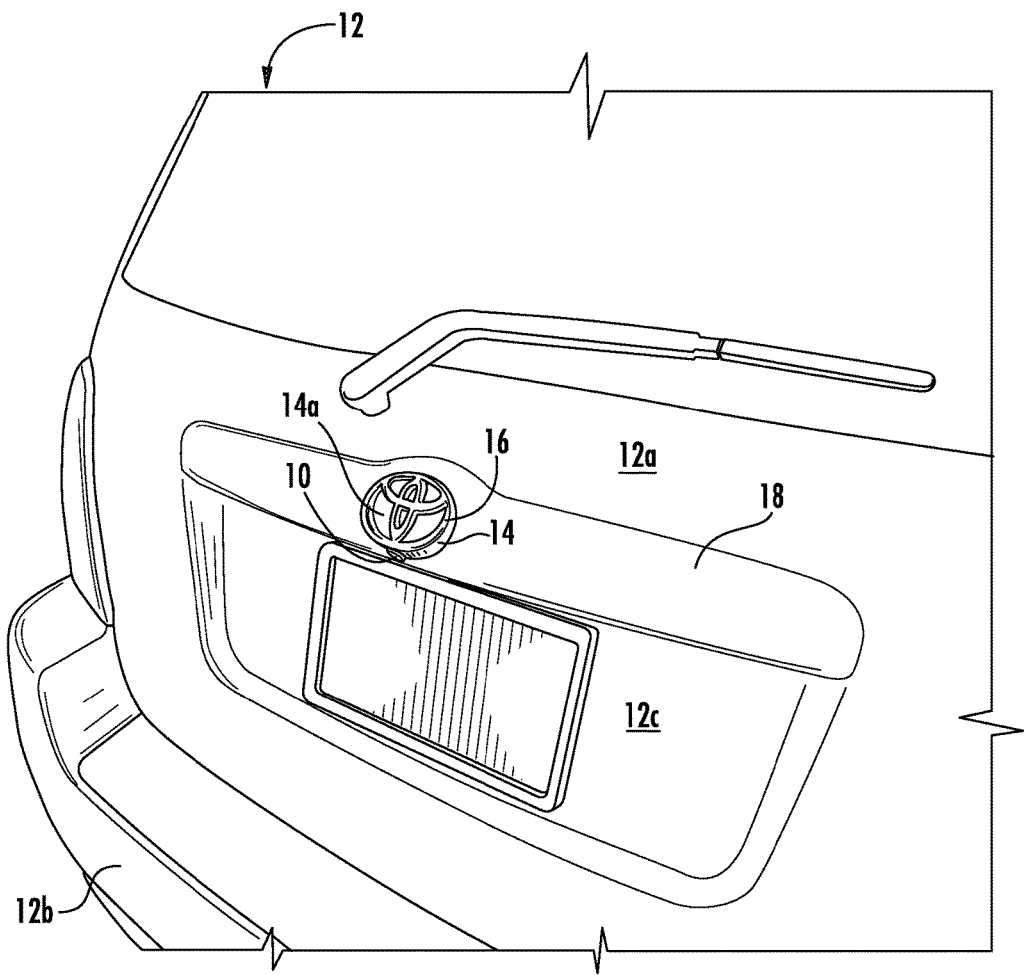
FIG. 1 is a perspective view of a vehicle incorporating an imaging device in accordance with the present invention.
Figure 2:
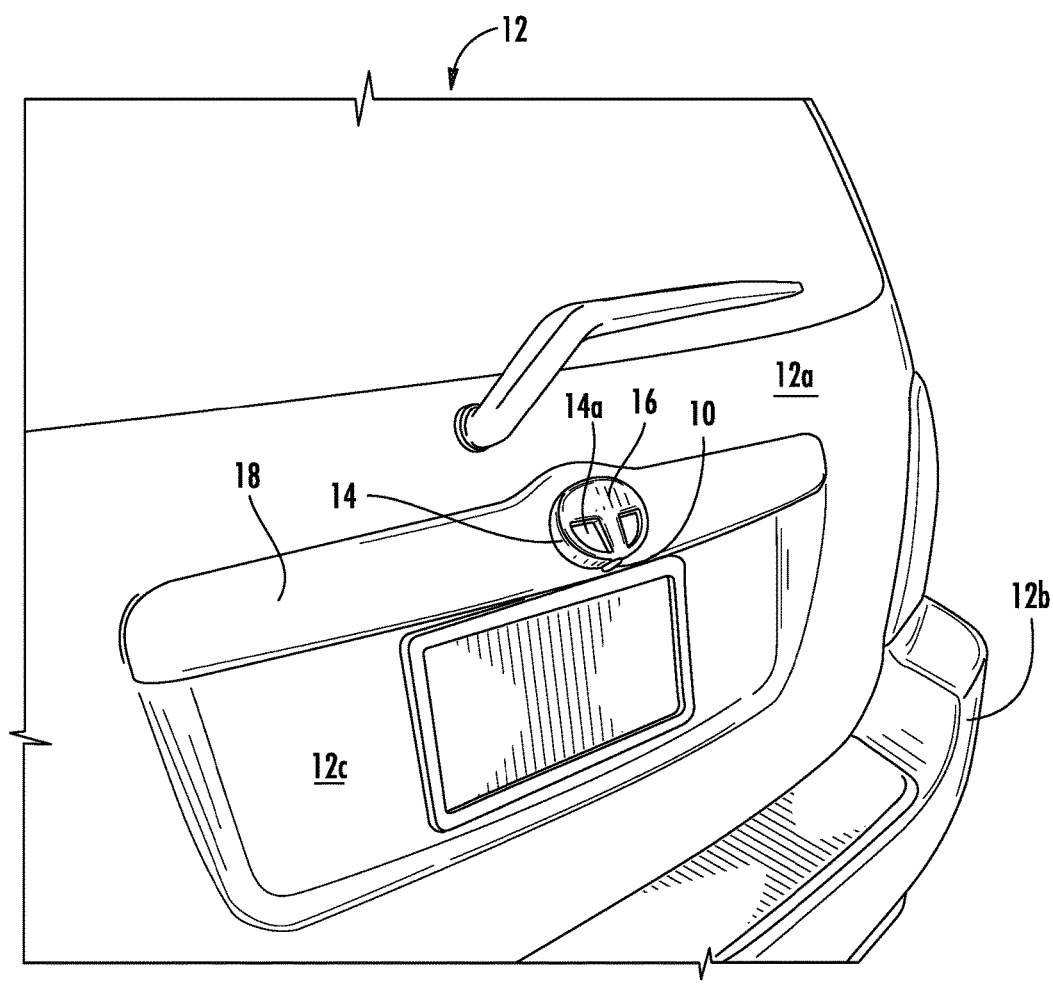
FIG. 2 is another perspective view of the vehicle and imaging device of the present invention.

Referring now to the drawings and the illustrative embodiments depicted therein, an imaging device or imaging sensor or camera 10 is located at a rear portion 12a of a vehicle 12 and has a generally rearward and downward field of view (FIGS. 1-5). As shown in FIGS. 1-5, imaging device 10 is located within a housing or encasement or extender element or tube 14 that protrudes rearwardly from the rear portion of the vehicle and that has a vehicle element 16 thereon, such as a vehicle emblem or decal or indicia or the like, so that the imaging device is not readily noticeable or discernible at the rear of the vehicle. The imaging device 10 thus is disposed at a location that is proud of or rearward of the rear surface of the rear portion 12a (such as a tailgate or lift gate or deck lid or the like) of the vehicle 12, such that the imaging device 10 may be directed substantially downward to have a field of view that encompasses the area immediately rearward of the vehicle and that includes a rear portion of the vehicle, such as a rear bumper 12b of the vehicle.

Typically, a vehicle will have a decal or emblem or indicia or label at the rear of the vehicle (such as a decal identifying the manufacturer or line or type of the vehicle). The vehicle element or decal 16 is typically attached or adhered to the rear of the vehicle (such as, for example, to a sill or trim portion 18 at the rear portion of the vehicle and establishing an overhang at the license plate recess or well 12c). The vehicle element 16 may be adhered to the rear trim portion 18 via a double-sided tape, or other means for adhering or attaching the decal may be implemented depending on the particular application. The vehicle element 16 thus may be removably attached to the rear of the vehicle, and may be removed therefrom, such as by a mechanic or a technician.

Figure 3:
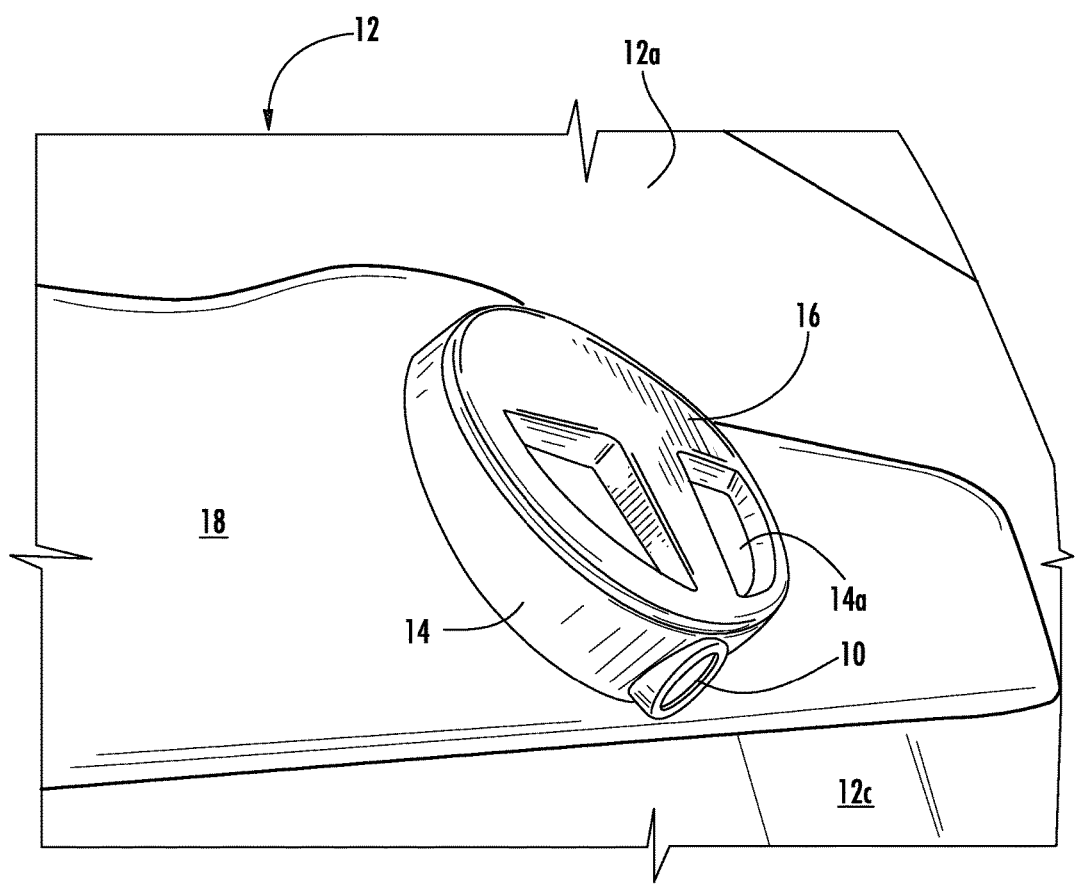
FIG. 3 is a perspective view of the imaging device of the present invention.
Figure 4:
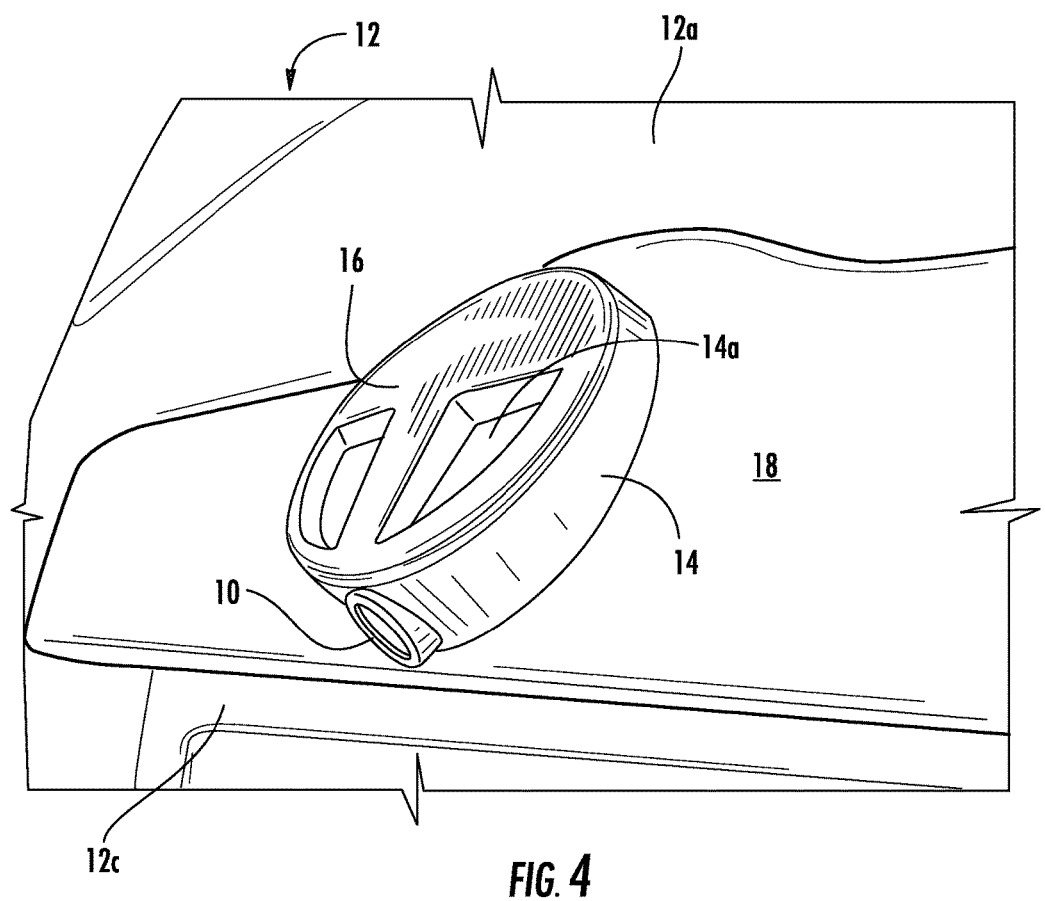
FIG. 4 is another perspective view of the imaging device of FIG. 3.
Figure 5:
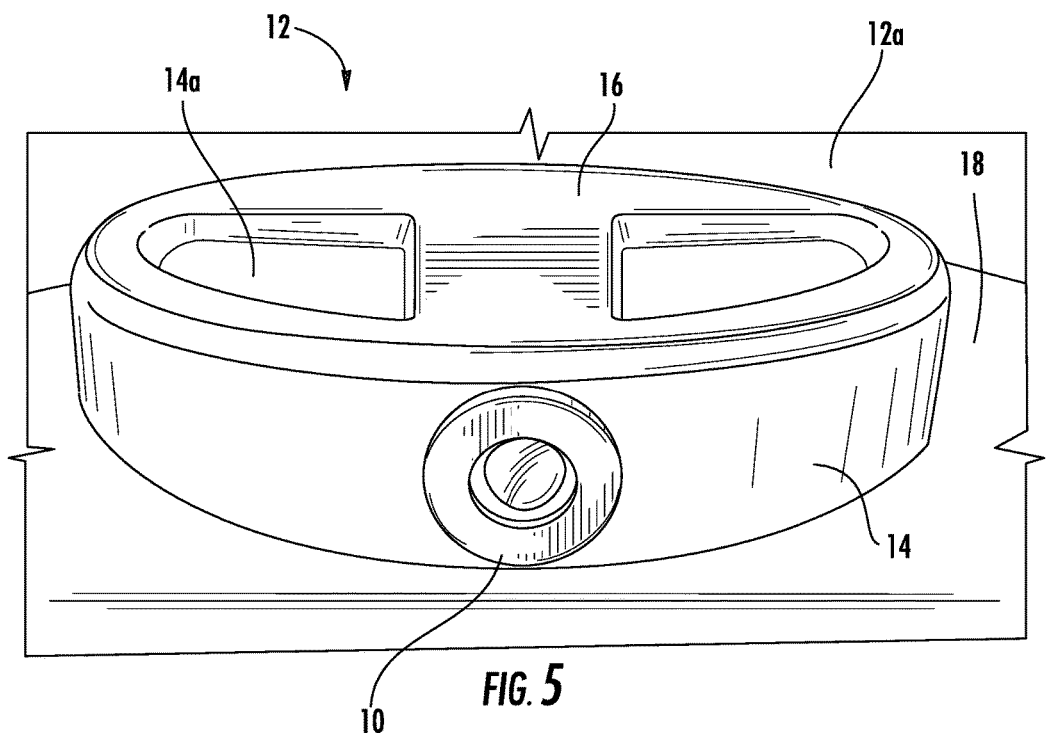
FIG. 5 is a lower plan view of the imaging device of FIGS. 3 and 4.

As best shown in FIGS. 3-5, imaging device 10 may be located within extender element or tube 14, which may be a generally cylindrical, hollow casing that may extend generally rearwardly from the rear trim portion 18 or from the rear panel of the vehicle. In the illustrated embodiment, the extender element 14 is generally cylindrical to generally match or correspond to the shape of the vehicle element 16 of the vehicle. However, the extender element may comprise any other shape depending on the shape of the vehicle element or decal or indicia or the like of the particular application of the imaging device and imaging system. For example, the extender element may be generally rectangular-shaped for applications on a Volvo vehicle, where the indicia is "VOLVO" at the rear, generally central region of the deck lid.

Thus, the vehicle element or emblem or decal 16 of a vehicle 12 may be removed, and the extender element 14, with imaging device 10 positioned therein, may be attached, such as via adhesive or welding or the like, to the rear portion 12a or rear surface or trim portion 18 of the vehicle. Optionally, a recess or aperture may be formed in the rear portion or trim portion for receiving the extender element at least partially therein to attach the extender element to the vehicle. When so attached, the extender element 14 protrudes rearwardly from the rear portion 12a of the vehicle so that the imaging device may be positioned rearward of the rear surface of the rear portion of the vehicle with a generally downward field of view. The emblem or decal or vehicle element 16 may be attached or adhered to the outer surface or outer end 14a of the extender element 14, so that the extender element is partially hidden by the emblem or decal or vehicle element, and the extender element and imaging device are thus not readily noticeable or discernible at the rear of the vehicle. For example, the original emblem or decal or the like may be reattached to the extender element or a new emblem or decal or the like may be attached to the extender element and thus may replace the original emblem or decal or the like.

The extender element 14 may comprise any suitable material, such as a metallic material or a polymeric material, and may be painted or colored to match the rear portion of the vehicle or the trim portion or the emblem or decal of the vehicle. Preferably, the outer side surface or surfaces and the rearward end surface of the extender element are finished to substantially match the surface finish of the rear portion of the vehicle or the trim portion (depending on where the imaging device and extender are attached and where the emblem or decal are attached to the vehicle), so that the extender element is not readily noticeable or discernible at the rear portion of the vehicle. Because the extender element 14 extends rearwardly from the rear portion of the vehicle, the extender element may be positioned at a generally central region of the rear portion of the vehicle, and will not interfere with a handle or latch or light or the like at the license plate well or recess at the rear of the vehicle.

The vehicle element may comprise any suitable element that provides camouflage at or renders covert the imaging device at the rear portion of the vehicle. For example, the vehicle element (that is attached to or adhered to or disposed at the outer portion of the extender element) may comprise a vehicle emblem or logo, a vehicle decal, a vehicle indicia, an exterior trim element of the vehicle, a rear tail gate handle or latch portion, a deck lid handle or latch portion, and/or a light bar element of the vehicle and/or the like. Optionally, for applications where the vehicle element comprises a vehicle emblem or logo or decal or the like, the extender element may be shaped to substantially match a shape of the vehicle emblem or logo or decal so that the vehicle emblem or logo or decal substantially encompasses the outer surface of the extender element.

The imaging device may be secured within the extender element, with its lens positioned at or near a lower surface of the extender element (when the extender element is attached to the vehicle). A hole or passageway may be formed through the rear portion or panel and/or trim portion of the vehicle so that any wiring associated with the imaging device may be routed from the imaging device and extender element to the vehicle and to the control or image processor of the associated imaging system. The imaging device thus may be installed at the rear of the vehicle and may be wired or electrically connected to a control or processor of the vehicle, and may be installed and connected during manufacture of the vehicle or as an aftermarket device or system.

Optionally, and desirably, the imaging device may comprise a pixelated imaging array having a plurality of light sensing photosensor pixels or elements, such as a two dimensional array of light sensing photosensor elements arranged on a semiconductor substrate. The imaging device may comprise a monochromatic imaging device or a black and white imaging device or a color imaging device or the like. Optionally, the imaging device may comprise a CMOS imaging device and/or a color CMOS imaging device, such as by utilizing aspects of the vision systems and imaging devices described in U.S. Pat. Nos. 6,989,736; 6,757,109; 6,717,610; 6,396,397; 6,201,642; 6,353,392; 6,313,454; 6,396,397; 5,550,677; 5,670,935; 5,796,094; 5,877,897; 6,097,023; and 6,498,620, and U.S. patent application Ser. No. 09/441,341, filed Nov. 16, 1999, now U.S. Pat. No. 7,339,149; Ser. No. 10/427,051, filed Apr. 30, 2003, now U.S. Pat. No. 7,038,577; Ser. No. 10/534,632, filed May 11, 2005, now U.S. Pat. No. 7,965,336; and/or Ser. No. 11/315, 675, filed Dec. 22, 2005, now U.S. Pat. No. 7,720,580, which are all hereby incorporated herein by reference in their entireties.

Figure 6:
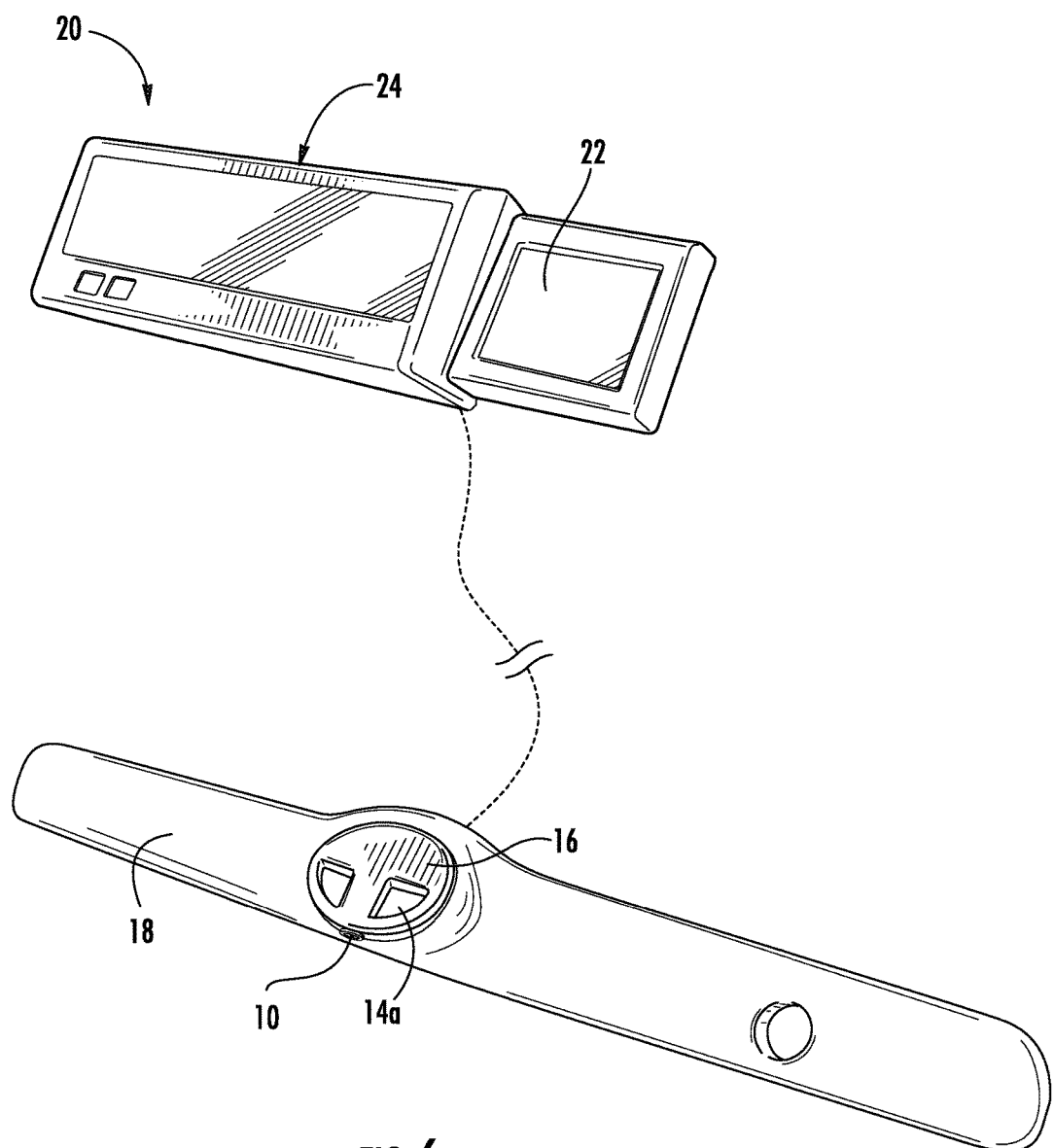
FIG. 6 is a perspective view of the components of an imaging system in accordance with the present invention.
Figure 7:
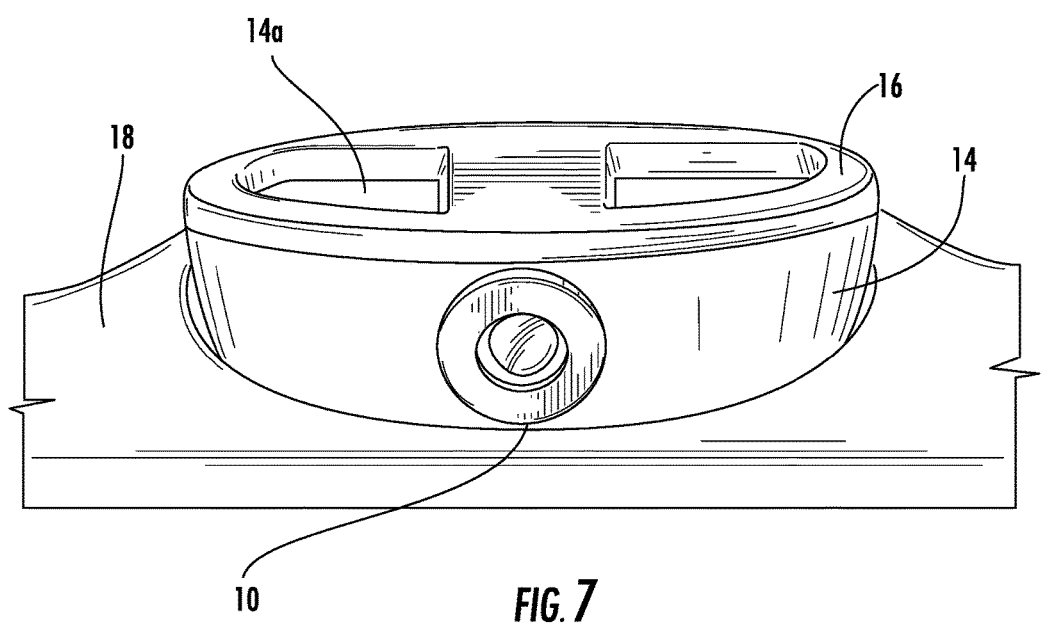
FIG. 7 is a lower plan view of the imaging device of the imaging system of FIG. 6.

As shown in FIG. 6, the imaging device 10 may be associated with an imaging system 20 having a display device or element 22 at an interior portion of the vehicle for viewing by a driver of the vehicle. For example, and desirably, the display element may be located at an interior rearview mirror assembly 24. The imaging system 20 may process images captured by the imaging device 10 and may display the video images at the display device 22 at the mirror assembly 24 for viewing by the driver of the vehicle, such as display devices of the types described below. The image data may be communicated from the imaging device to the display device (or to an image processor or the like) via any suitable communication link or protocol. For example, the imaging device and the display device may communicate or output and receive signals utilizing aspects of the systems described in U.S. patent application Ser. No. 11/239,980, filed Sep. 30, 2005, now U.S. Pat. No. 7,881, 496; and/or U.S. provisional applications, Ser. No. 60/628, 709, filed Nov. 17, 2004; Ser. No. 60/614,644, filed Sep. 30, 2004; Ser. No. 60/618,686, filed Oct. 14, 2004, which are all hereby incorporated herein by reference in their entireties.

The imaging device thus may be located at a generally central region of the vehicle and may be positioned so as to have a generally or substantially downward field of view so as to capture images of the area immediately rearward of the vehicle. The field of view of the imaging device may include a rear portion of the vehicle, such as a rear bumper of the vehicle or the like, so as to provide a reference for the driver when viewing the video images within the vehicle, such as during reverse maneuvering of the vehicle. The imaging device thus may be covertly disposed at the rear of the vehicle so as to be substantially camouflaged or rendered covert, while protruding a sufficient amount rearward of the rear surface of the rear of the vehicle so as to provide a generally downward and rearward field of view for capturing images of the area substantially immediately rearward of the vehicle, such as for a backup assist system and display. The imaging device and/or a lens or housing or other elements associated with the imaging device may utilize aspects of the imaging devices described in U.S. Pat. Nos. 6,989,736; 6,757,109; 6,717,610; 6,396,397; 6,201,642; 6,353,392; 6,313,454; 6,396,397; 5,550,677; 5,670,935; 5,796,094; 5,877,897; 6,097,023; and 6,498,620, and U.S. patent application Ser. No. 10/534,632, filed May 11, 2005, now U.S. Pat. No. 7,965,336, and/or PCT Application No. PCT/US2006/041709, filed Oct. 27, 2006, published on Dec. 31, 2008, as International Publication No. WO 2007/ 053404, which are all hereby incorporated herein by reference in their entireties.

Optionally, the imaging device and/or the display device may be activated to capture and display images of the rearward and downward field of view in response to the vehicle being shifted into a reverse gear. Thus, the display may be episodically actuated only when it is desired or appropriate to display the area immediately rearward of the vehicle, such as when the driver is performing rearward driving maneuvers, and may be deactivated when it is no longer suitable for displaying the rearward images, such as when the driver shifts the vehicle into a forward gear for forward driving.

The display or display device preferably comprises a video display device for displaying video images of the scene substantially immediately rearward of the vehicle. For example, the video display device of the imaging system may comprise an LCD type back lit video display, such as the types described in U.S. Pat. No. 6,847,487; PCT Application No. PCT/US03/40611, filed Dec. 19, 2003, published on Jul. 15, 2004, as International Publication No. WO 04/058540; PCT Application No. PCT/US2006/042718, filed Oct. 31, 2006, published on Apr. 23, 2009, as International Publication No. WO 2007/053710; U.S. patent application Ser. No. 11/284,543, filed Nov. 22, 2005, now U.S. Pat. No. 7,370,983; and/or Ser. No. 10/538,724, filed Jun. 13, 2005 and published Mar. 9, 2006 as U.S. Publication No. US-2006-0050018, and/or U.S. provisional applications, Ser. No. 60/630,061, filed Nov. 22, 2004; Ser. No. 60/667,048, filed Mar. 31, 2005; Ser. No. 60/732,245, filed Nov. 1, 2005; Ser. No. 60/759,992, filed Jan. 18, 2006; and/or Ser. No. 60/836,219, filed Aug. 8, 2006, which are hereby incorporated herein by reference in their entireties. As shown in FIG. 6, display device 22 may comprise a slide-out, extendable/retractable display device, such as the types described in PCT Application No. PCT/US03/40611, filed Dec. 19, 2003, published on Jul. 15, 2004, as International Publication No. WO 04/058540, U.S. patent application Ser. No. 11/284,543, filed Nov. 22, 2005, now U.S. Pat. No. 7,370,983; and/or Ser. No. 10/538,724, filed Jun. 13, 2005 and published Mar. 9, 2006 as U.S. Publication No. US-2006-0050018, and/or U.S. provisional applications, Ser. No. 60/630,061, filed Nov. 22, 2004; Ser. No. 60/667,048, filed Mar. 31, 2005, which are hereby incorporated herein by reference in their entireties.

In addition, placing a video screen in a mirror assembly (and behind the mirror reflective element so that the display is transmitted through the reflective element for viewing by an occupant of the vehicle) is known, and it is also known to covertly locate the video screens behind the reflective element to provide a DOD (Display-on-Demand) display through the transflective reflective element, such that the presence of the video screen is only noticeable or discernible when the video screen is activated, such as by utilizing aspects described in U.S. Pat. Nos. 6,690,268; 5,668,663 and/or 5,724,187, and/or in U.S. patent application Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 10/538,724, filed Jun. 13, 2005 and published Mar. 9, 2006 as U.S. Publication No. US-2006-0050018; Ser. No. 11/226,628, filed Sep. 14, 2005 and published Mar. 23, 2006 as U.S. Publication No. US-2006-0061008; Ser. No. 11/284,543, filed Nov. 22, 2005, now U.S. Pat. No. 7,370,983, and/or PCT Application No. PCT/US2006/042718, filed Oct. 31, 2006, published on Apr. 23, 2009, as International Publication No. WO 2007/053710, which are all hereby incorporated herein by reference in their entireties.

Optionally, an anti-reflection coating may be disposed at the front surface of the reflective element and at the display area to reduce the first surface reflection at the display area to reduce display washout, such as by utilizing aspects described in U.S. Pat. No. 5,076,674; and/or PCT Application No. PCT/US2006/042718, filed Oct. 31, 2006, published on Apr. 23, 2009, as International Publication No. WO 2007/053710; and/or U.S. provisional applications, Ser. No. 60/759,992, filed Jan. 18, 2006, and/or Ser. No. 60/836,219, filed Aug. 11, 2006, which are hereby incorporated herein by reference in their entireties.

Optionally, the video display screen may comprise a scanning beam display system that includes a plurality of laser light sources or diodes, a controller and a micro-electromechanical scanner (MEMS), such as the types described in U.S. Pat. No. 6,847,487; and/or U.S. patent application Ser. No. 11/226,628, filed Sep. 14, 2005 and published Mar. 23, 2006 as U.S. Publication No. US-2006-0061008, which is hereby incorporated herein by reference in its entirety. Other means may be implemented to provide a display screen at the mirror assembly that achieves reduced display washout on a sunny day, such as described in PCT Application No. PCT/US2006/042718, filed Oct. 31, 2006, published on Apr. 23, 2009, as International Publication No. WO 2007/053710; and/or U.S. provisional applications, U.S. provisional applications, Ser. No. 60/732,245, filed Nov. 1, 2005; and/or Ser. No. 60/759,992, filed Jan. 18, 2006, and/or Ser. No. 60/836,219, filed Aug. 11, 2006, which are hereby incorporated herein by reference in their entireties. Optionally, for example, a video slide-out mirror may be provided that includes a video display screen that slides out or otherwise extends to a viewable position when it is activated, such as a video mirror of the types described in U.S. Pat. No. 6,690,268, and/or U.S. patent application Ser. No. 11/284,543, filed Nov. 22, 2005, now U.S. Pat. No. 7,370,983; and/or Ser. No. 10/538,724, filed Jun. 13, 2005 and published Mar. 9, 2006 as U.S. Publication No. US-2006-0050018; PCT Application No. PCT/US03/40611, filed Dec. 19, 2003, published on Jul. 15, 2004, as International Publication No. WO 04/058540, and/or U.S. provisional applications, Ser. No. 60/630,061, filed Nov. 22, 2004; and Ser. No. 60/667,048, filed Mar. 31, 2005, which are hereby incorporated herein by reference in their entireties.

As discussed above, the mirror assembly may be utilized with a video slide-out mirror, such as the types described in U.S. patent application Ser. No. 11/284,543, filed Nov. 22, 2005, now U.S. Pat. No. 7,370,983; and/or Ser. No. 10/538,724, filed Jun. 13, 2005 and published Mar. 9, 2006 as U.S. Publication No. US-2006-0050018; PCT Application No. PCT/US03/40611, filed Dec. 19, 2003, published on Jul. 15, 2004, as International Publication No. WO 04/058540, and/or U.S. provisional applications, Ser. No. 60/630,061, filed Nov. 22, 2004; and Ser. No. 60/667,048, filed Mar. 31, 2005, which are hereby incorporated herein by reference in their entireties. Further, when such a vehicle equipped with such a video mirror is also equipped with a side viewing or front viewing or rear viewing sensor vision system (such as by utilizing a radar sensor or an ultrasonic sensor or a camera sensor (such as described in U.S. Pat. No. 7,038,577; and/or U.S. patent application Ser. No. 11/239,980, filed Sep. 30, 2005, now U.S. Pat. No. 7,881,496; and/or Ser. No. 11/315,675, filed Dec. 22, 2005, now U.S. Pat. No. 7,720,580, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; and/or Ser. No. 60/638,687, filed Dec. 23, 2004, which are hereby incorporated herein by reference in their entireties) to monitor an area adjacent the vehicle), the video screen may automatically extend when such a sensor system detects the presence of an obstacle and/or a human adjacent to the vehicle. Also, the video display screen may extend in conjunction with a trailer-hitch monitoring system (such as the types described in U.S. patent application Ser. No. 10/418,486, filed Apr. 18, 2003, now U.S. Pat. No. 7,005,974, which is hereby incorporated herein by reference in its entirety) and icons and/or indicia and/or instructions may be created on the video image displayed on the extended video screen of the video mirror to assist or guide the driver to hitch a trailer to the trailer hitch of the vehicle.

Optionally, the mirror assembly may include one or more user actuatable inputs or input devices or human machine interfaces. For example, the inputs or user interfaces may include buttons, such as are described in U.S. Pat. No. 6,501,387; and/or U.S. patent application Ser. No. 11/451,639, filed Jun. 13, 2006, now U.S. Pat. No. 7,527,403; and/or U.S. provisional applications, Ser. No. 60/690,401, filed Jun. 14, 2005; Ser. No. 60/719,482, filed Sep. 22, 2005; and/or Ser. No. 60/749,423, filed Dec. 12, 2005, which are hereby incorporated herein by reference in their entireties, or that include touch/proximity sensors such as are disclosed in U.S. Pat. Nos. 6,001,486; 6,310,611; 6,320,282; and 6,627,918, and U.S. patent application Ser. No. 09/817,874, filed Mar. 26, 2001, now U.S. Pat. No. 7,224,324, and PCT Application No. PCT/US03/40611, filed Dec. 19, 2003, published on Jul. 15, 2004, as International Publication No. WO 04/058540, which are hereby incorporated herein by reference in their entireties, or that include other types of buttons or switches, such as those described in U.S. patent application Ser. No. 11/029,695, filed Jan. 5, 2005, now U.S. Pat. No. 7,253,723; and/or U.S. provisional applications, Ser. No. 60/556,259, filed Mar. 25, 2004; Ser. No. 60/553,517, filed Mar. 16, 2004; and Ser. No. 60/535,559, filed Jan. 9, 2004; and/or PCT Application No. PCT/US2004/015424, filed May 18, 2004, published Dec. 2, 2004, as International Publication No. WO 2004/10377282, which are hereby incorporated herein by reference in their entireties, or that include fabric-made position detectors, such as are disclosed in U.S. Pat. Nos. 6,504,531; 6,501,465; 6,492,980; 6,452,479; 6,437,258; and 6,369,804, which are hereby incorporated herein by reference in their entireties. The manual inputs or user actuatable inputs or actuators may control or adjust or activate/deactivate one or more accessories or elements or features. For touch sensitive inputs or applications or switches, the mirror assembly or accessory module or input may, when activated, provide a positive feedback (such as activation of an illumination source or the like, or such as via an audible signal, such as a chime or the like, or a tactile or haptic signal, or a rumble device or signal or the like) to the user so that the user is made aware that the input was successfully activated.

The rearview mirror assembly may comprise an electro-optic or electrochromic reflective element or cell, such as an electrochromic mirror assembly and electrochromic reflective element utilizing principles disclosed in commonly assigned U.S. Pat. Nos. 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407; 4,824,221; 5,818,636; 6,166,847; 6,111,685; 6,392,783; 6,710,906; 6,798,556; 6,554,843; 6,420,036; 6,286,965; 6,196,688; 5,535,056; 5,751,489; 6,065,840 and/or 4,712,879, and/or U.S. patent application Ser. No. 10/054,633, filed Jan. 22, 2002, now U.S. Pat. No. 7,195,381; Ser. No. 10/993,302, filed Nov. 19, 2004, now U.S. Pat. No. 7,338,177; Ser. No. 10/528,269, filed Mar. 17, 2005, now U.S. Pat. No. 7,274,501; Ser. No. 10/533,762, filed May 4, 2005, now U.S. Pat. No. 7,184,190; and/or Ser. No. 11/021,065, filed Dec. 23, 2004, now U.S. Pat. No. 7,255,451, and/or International Pat. Publication Nos. WO 2004/098953, published Nov. 18, 2004; WO 2004/042457, published May 21, 2004; WO 2003/084780, published Oct. 16, 2003; and/or WO 2004/026633, published Apr. 1, 2004, which are all hereby incorporated herein by reference in their entireties, and/or as disclosed in the following publications: N. R. Lynam, "Electrochromic Automotive Day/Night Mirrors", *SAE Technical Paper Series* 870636 (1987); N. R. Lynam, "Smart Windows for Automobiles", *SAE Technical Paper Series* 900419 (1990); N. R. Lynam and A. Agrawal, "Automotive Applications of Chromogenic Materials", *Large Area Chromogenics: Materials and Devices for Transmittance Control*, C. M. Lampert and C. G. Granquist, EDS., Optical Engineering Press, Wash. (1990), which are hereby incorporated by reference herein in their entireties.

The transparent conductive layer or layers at the second and third surfaces of the reflective element may comprise any suitable transparent conductive coatings or layers, such as an indium tin oxide (ITO) or doped (antimony or fluorine doped) tin oxide or doped zinc oxide (such as aluminum-doped zinc oxide) or an ITO/thin Ag/ITO stack or an ITO/thin Al/ITO stack or a thin (preferably, less than about 200 angstroms in physical thickness; more preferably less than about 150 angstroms thick; most preferably less than about 125 angstroms thick; and greater than about 75 angstroms thick, more preferably greater than about 85 angstroms thick and most preferably greater than about 100 angstroms thick) coating of silver (or a silver alloy) sandwiched between ITO or doped zinc oxide layers or a thin coating of aluminum (or an aluminum alloy) sandwiched between ITO or doped zinc oxide layers or a thin coating of platinum or palladium (or an alloy thereof) sandwiched between ITO or doped zinc oxide layers or a thin coating of ruthenium (or a ruthenium alloy) sandwiched between ITO or doped zinc oxide layers, or such as the conductive layers described in U.S. Pat. Nos. 6,690,268; 5,668,663; 5,142,406; 5,442,478 and 5,724,187, and/or in U.S. patent application Ser. No. 10/054,633, filed Jan. 22, 2002, now U.S. Pat. No. 7,195,381; Ser. No. 11/021,065, filed Dec. 23, 2004, now U.S. Pat. No. 7,255,451; Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 10/538,724, filed Jun. 13, 2005 and published Mar. 9, 2006 as U.S. Publication No. US-2006-0050018; Ser. No. 11/226,628, filed Sep. 14, 2005 and published Mar. 23, 2006 as U.S. Publication No. US-2006-0061008; Ser. No. 10/993,302, filed Nov. 19, 2004, now U.S. Pat. No. 7,338,177; and/or Ser. No. 11/284,543, filed Nov. 22, 2005, now U.S. Pat. No. 7,370,983, and/or in PCT Application No. PCT/US03/29776, filed Sep. 19, 2003, published on Apr. 1, 2004, as International Publication No. WO 04/026633; and/or PCT Application No. PCT/US03/35381, filed Nov. 5, 2003, published May 21, 2004, as International Publication No. WO 2004/042457, which are hereby incorporated herein by reference in their entireties.

Optionally, the mirror reflector element may include a metal border electrical conductor band (such as disclosed in U.S. patent application Ser. No. 11/226,628, filed Sep. 14, 2005 and published Mar. 23, 2006 as U.S. Publication No. US-2006-0061008; and/or PCT Application No. PCT/US2006/018567, filed May 16, 2006, published Jul. 5, 2007, as International Publication No. WO 2006/124682; and/or U.S. provisional applications, Ser. No. 60/681,250, filed May 16, 2005; Ser. No. 60/690,400, filed Jun. 14, 2005; Ser. No. 60/695,149, filed Jun. 29, 2005; Ser. No. 60/730,334, filed Oct. 26, 2005; Ser. No. 60/750,199, filed Dec. 14, 2005; Ser. No. 60/774,449, filed Feb. 17, 2006; and Ser. No. 60/783,496, filed Mar. 18, 2006, which are hereby incorporated herein by reference in their entireties) around and preferably fully circumscribing the border perimeter of the second surface of the front substrate so that there is a highly conductive all-around electrically conductive raceway around the ITO (or similar transparent electronic conductor coating or coatings) on the second surface of the front substrate. Flush or near-flush constructions are preferred (such as disclosed in U.S. patent application Ser. No. 11/021,065, filed Dec. 23, 2004, now U.S. Pat. No. 7,255,451; Ser. No. 10/528,269, filed Mar. 17, 2005, now U.S. Pat. No.

7,274,501; Ser. No. 10/533,762, filed May 4, 2005, now U.S. Pat. No. 7,184,190; and/or Ser. No. 11/226,628, filed Sep. 14, 2005 and published Mar. 23, 2006 as U.S. Publication No. US-2006-0061008, which are hereby incorporated herein by reference in their entireties), and use of a maximum powering voltage of at least about 1.3 volts is preferred, more preferred at least about 1.35V and most preferred at least about 1.4V. Also, the composition and optical thickness and optical constants (including refractive index) of the transparent conductor (such as ITO) used on the second surface of the front substrate is selected and adapted to minimize any visible light reflectance off this second surface interface (and if beneficial, additional anti-reflection layers and means, as known in the optical arts, can be used to reduce or eliminate such second surface reflections). Transmission through the EC medium for such very dark dimming interior mirror EC cells is preferably less than about 13% T, more preferably less than about 8% T and most preferably is less than about 3% T when fully dimmed under the maximum applied voltage delivered by the EC mirror element powering circuitry of the automatic dimming interior mirror assembly. Note that aspects of such improvements in delivery of darker dimming electrically variable reflectivity interior automotive mirrors may also be applied to electrically variable reflectance automotive exterior mirrors.

Although shown and described as an electro-optic or electrochromic electro-optic element assembly or cell, the reflective element may comprise a single substrate (and thus only having a first surface and a second surface) with a reflective coating at its rear (second) surface, without affecting the scope of the present invention. For example, the mirror assembly may comprise a prismatic mirror element or other mirror element having a single substrate reflective element, such as a mirror assembly utilizing aspects described in U.S. Pat. Nos. 6,318,870; 6,598,980; 5,327,288; 4,948,242; 4,826,289; 4,436,371; and 4,435,042; and PCT Application No. PCT/US04/015424, filed May 18, 2004, published Dec. 2, 2004, as International Publication No. WO 04/103772; and U.S. patent application Ser. No. 10/933,842, filed Sep. 3, 2004, now U.S. Pat. No. 7,249,860, which are all hereby incorporated herein by reference in their entireties. Optionally, the reflective element may comprise a conventional prismatic or flat reflective element or prism, or may comprise a prismatic or flat reflective element of the types described in PCT Application No. PCT/US03/29776, filed Sep. 19, 2003, published Apr. 1, 2004, as International Publication No. WO 04/026633; U.S. patent application Ser. No. 10/709,434, filed May 5, 2004, now U.S. Pat. No. 7,420,756; Ser. No. 10/528,269, filed Mar. 17, 2005, now U.S. Pat. No. 7,274,501; Ser. No. 10/933,842, filed Sep. 3, 2004, now U.S. Pat. No. 7,249,860; Ser. No. 11/021,065, filed Dec. 23, 2004, now U.S. Pat. No. 7,255,451; and/or Ser. No. 10/993,302, filed Nov. 19, 2004, now U.S. Pat. No. 7,338,177, and/or PCT Application No. PCT/US2004/015424, filed May 18, 2004, published Dec. 2, 2004, as International Publication No. WO 04/103772, which are all hereby incorporated herein by reference in their entireties, without affecting the scope of the present invention. A variety of mirror accessories and constructions are known in the art, such as those disclosed in U.S. Pat. Nos. 5,555,136; 5,582,383; 5,680,263; 5,984,482; 6,227,675; 6,229,319; and 6,315,421 (the entire disclosures of which are hereby incorporated by reference herein), that can benefit from the present invention.

Optionally, the mirror assembly may include one or more displays at the reflective element or elsewhere at the mirror assembly, such as displays of the types described in U.S. Pat. Nos. 5,530,240 and/or 6,329,925, which are hereby incorporated herein by reference in their entireties, and/or display-on-demand or transflective type displays, such as the types disclosed in U.S. Pat. Nos. 6,690,268; 5,668,663 and/or 5,724,187, and/or in U.S. patent application Ser. No. 10/054,633, filed Jan. 22, 2002, now U.S. Pat. No. 7,195,381; Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 10/538,724, filed Jun. 13, 2005 and published Mar. 9, 2006 as U.S. Publication No. US-2006-0050018; Ser. No. 11/226,628, filed Sep. 14, 2005 and published Mar. 23, 2006 as U.S. Publication No. US-2006-0061008; Ser. No. 10/993,302, filed Nov. 19, 2004, now U.S. Pat. No. 7,338,177; Ser. No. 11/284,543, filed Nov. 22, 2005, now U.S. Pat. No. 7,370,983; and/or Ser. No. 11/021,065, filed Dec. 23, 2004, now U.S. Pat. No. 7,255,451; and/or PCT Application No. PCT/US03/29776, filed Sep. 9, 2003, published Apr. 1, 2004, as International Publication No. WO 04/026633; and/or PCT Application No. PCT/US03/35381, filed Nov. 5, 2003, published May 21, 2004, as International Publication No. WO 2004/042457; and/or U.S. provisional applications, Ser. No. 60/630,061, filed Nov. 22, 2004; Ser. No. 60/667,048, filed Mar. 31, 2005; Ser. No. 60/629,926, filed Nov. 22, 2004; Ser. No. 60/531,838, filed Dec. 23, 2003; Ser. No. 60/553,842, filed Mar. 17, 2004; Ser. No. 60/563,342, filed Apr. 19, 2004; Ser. No. 60/681,250, filed May 16, 2005; Ser. No. 60/690,400, filed Jun. 14, 2005; Ser. No. 60/695,149, filed Jun. 29, 2005; Ser. No. 60/717,093, filed Sep. 14, 2005; Ser. No. 60/730,334, filed Oct. 26, 2005; Ser. No. 60/750,199, filed Dec. 14, 2005; Ser. No. 60/774,449, filed Feb. 17, 2006; and Ser. No. 60/783,496, filed Mar. 18, 2006; Ser. No. 60/732,245, filed Nov. 1, 2005; and/or Ser. No. 60/759,992, filed Jan. 18, 2006, and/or PCT Application No. PCT/US03/40611, filed Dec. 19, 2003, published Jul. 15, 2004, as International Publication No. WO 04/058540, and/or PCT Application No. PCT/US2006/018567, filed May 16, 2006, published Jul. 15, 2007, as International Publication No. WO 2006/124682, and/or PCT Application No. PCT/US2006/042718, filed Oct. 31, 2006, published Apr. 23, 2009, as International Publication No. WO 2007/053710, which are all hereby incorporated herein by reference in their entireties.

Optionally, the mirror assembly may support one or more other accessories or features, such as one or more electrical or electronic devices or accessories. For example, illumination sources or lights, such as map reading lights or one or more other lights or illumination sources, such as illumination sources of the types disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 6,971,775; and/or 5,669,698, and/or U.S. patent application Ser. No. 10/054,633, filed Jan. 22, 2002, now U.S. Pat. No. 7,195,381; and/or Ser. No. 10/933,842, filed Sep. 3, 2004, now U.S. Pat. No. 7,249,860, which are hereby incorporated herein by reference in their entireties, may be included in the mirror assembly. The illumination sources and/or the circuit board may be connected to one or more buttons or inputs for activating and deactivating the illumination sources. Optionally, the mirror assembly may also or otherwise include other accessories, such as microphones, such as analog microphones or digital microphones or the like, such as microphones of the types disclosed in U.S. Pat. Nos. 6,243,003; 6,278,377; and/or 6,420,975, and/or in PCT Application No. PCT/US03/308877, filed Oct. 1, 2003, published Apr. 15, 2004, as International Publication No. WO 2004/032568, which are hereby incorporated herein by reference in their entireties. Optionally, the mirror assembly may also or otherwise include other accessories, such as a telematics system, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot detection and/or indication system, such as disclosed in U.S. Pat. Nos. 5,929,786 and/or 5,786,772, and/or U.S. patent application Ser. No. 10/427,051, filed Apr. 30, 2003, now U.S. Pat. No. 7,038,577; Ser. No. 10/209,173, filed Jul. 31, 2002, now U.S. Pat. No. 6,882,287; and Ser. No. 11/315,675, filed Dec. 22, 2005, now U.S. Pat. No. 7,720,580; and/or Ser. No. PCT/US06/026148, filed Jul. 6, 2006, published Apr. 16, 2009, as International Publication No. WO 2007/005942; and/or U.S. provisional applications, Ser. No. 60/638,687, filed Dec. 23, 2004; Ser. No. 60/784,570, filed Mar. 22, 2006; and/or Ser. No. 60/696,953, filed Jul. 6, 2005, a docking station and/or multimedia display, such as the types described in U.S. provisional applications, Ser. No. 60/879, 619, filed Jan. 10, 2007; Ser. No. 60/850,700, filed Oct. 10, 2006; and U.S. provisional application Ser. No. 60/847,502, filed Sep. 27, 2006, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 6,690,268 and 6,847, 487; and/or U.S. provisional applications, Ser. No. 60/614, 644, filed Sep. 30, 2004; Ser. No. 60/618,686, filed Oct. 14, 2004; Ser. No. 60/628,709, filed Nov. 17, 2004; Ser. No. 60/644,903, filed Jan. 11, 2005; Ser. No. 60/667,049, filed Mar. 31, 2005; and/or U.S. patent application Ser. No. 11/105,757, filed Apr. 14, 2005, now U.S. Pat. No. 7,526, 103; and/or Ser. No. 11/239,980, filed Sep. 30, 2005, now U.S. Pat. No. 7,881,496, a video device for internal cabin surveillance (such as for sleep detection or driver drowsiness detection or the like) and/or video telephone function, such as disclosed in U.S. Pat. Nos. 5,760,962 and/or 5,877,897, a heating element, particularly for an exterior mirror application, such as the types described in U.S. patent application Ser. No. 11/334,139, filed Jan. 18, 2006, now U.S. Pat. No. 7,400,435, a remote keyless entry receiver, a seat occupancy detector, a remote starter control, such as the types described in U.S. provisional application, Ser. No. 60/859,680, filed Nov. 17, 2006, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445, 287; 6,472,979; and/or 6,731,205; and/or U.S. patent application Ser. No. 11/232,324, filed Sep. 21, 2005, now U.S. Pat. No. 7,423,522; and/or U.S. provisional application, Ser. No. 60/611,796, filed Sep. 21, 2004), and/or an ONSTAR® system and/or any other accessory or circuitry or the like (with all of the above-referenced patents and PCT and U.S. patent applications and U.S. provisional applications being commonly assigned, and with the disclosures of the referenced patents and patent applications and provisional applications being hereby incorporated herein by reference in their entireties).

Optionally, the mirror assembly may incorporate or accommodate or be associated with other accessories, such as a compass sensor or system, such as a compass or compass system of the types described in U.S. patent application Ser. No. 11/305,637, filed Dec. 16, 2005, now U.S. Pat. No. 7,329,013; Ser. No. 10/352,691, filed Jan. 28, 2003, now U.S. Pat. No. 6,922,902; Ser. No. 11/284,543, filed Nov. 22, 2005, now U.S. Pat. No. 7,370,983; Ser. No. 11/226,628, filed Sep. 14, 2005 and published Mar. 23, 2006 as U.S. Publication No. US-2006-0061008; and/or Ser. No. 10/933,842, filed Sep. 3, 2004, now U.S. Pat. No. 7,249,860; and/or U.S. Pat. Nos. 7,004,593; 4,546,551; 5,699,044; 4,953,305; 5,576,687; 5,632,092; 5,677,851; 5,708,410; 5,737,226; 5,802,727; 5,878,370; 6,087,953; 6,222,460; 5,255,442; 6,173,501; 6,427,349; 6,278,271; 5,942,895; 6,184,679; 6,513,252; and 6,642,851, and/or PCT Application No. PCT/US2004/015424, filed May 18, 2004, published Dec. 2, 2004, as International Publication No. WO 04/103772, and/or European patent application, published Oct. 11, 2000 under Publication No. EP 0 1043566; and/or PCT Publication No. WO 2004/076971, published Sep. 10, 2004, which are all hereby incorporated herein by reference in their entireties.

Optionally, the mirror assembly may accommodate other accessories or circuitry or the like as well, such as a rain sensor or imaging device or the like. For example, the mirror assembly may include a mounting portion (such as the types described in U.S. patent application Ser. No. 11/226,628, filed Sep. 14, 2005 and published Mar. 23, 2006 as U.S. Publication No. US-2006-0061008; and/or U.S. provisional applications, Ser. No. 60/692,113, filed Jun. 20, 2005; Ser. No. 60/677,990, filed May 5, 2005; Ser. No. 60/653,787, filed Feb. 17, 2005; Ser. No. 60/642,227, filed Jan. 7, 2005; Ser. No. 60/638,250, filed Dec. 21, 2004; Ser. No. 60/624, 091, filed Nov. 1, 2004, and Ser. No. 60/609,642, filed Sep. 14, 2004, which are all hereby incorporated herein by reference in their entireties), and may include a rain sensor or the like and may position the rain sensor against the windshield, such as described in U.S. Pat. Nos. 6,250,148; 6,341,523; and 6,824,281, and in U.S. patent application Ser. No. 10/023,162, filed Dec. 17, 2001, now U.S. Pat. No. 6,516,664; Ser. No. 10/348,514, filed Jan. 21, 2003, now U.S. Pat. No. 6,968,736; and Ser. No. 10/958,087, filed Oct. 4, 2004, now U.S. Pat. No. 7,188,963, which are all hereby incorporated herein by reference in their entireties. Optionally, the mirror assembly may include an imaging device, such as an imaging array sensor for imaging systems of the types described in U.S. Pat. Nos. 6,989,736; 6,757,109; 6,717,610; 6,396,397; 6,201,642; 6,353,392; 6,313,454; 6,396,397; 5,550,677; 5,670,935; 5,796,094; 5,877,897; 6,097,023; and 6,498,620, and U.S. patent application Ser. No. 09/441,341, filed Nov. 16, 1999, now U.S. Pat. No. 7,339,149; Ser. No. 10/427,051, filed Apr. 30, 2003, now U.S. Pat. No. 7,038,577; and/or Ser. No. 11/315,675, filed Dec. 22, 2005, now U.S. Pat. No. 7,720,580, which are all hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicle vision system, said vehicle vision system comprising:

a vehicle having a rear portion;

an extender element disposed at the rear portion so as to protrude rearward from the rear portion of the vehicle;

said extender element comprising an extender portion and an end portion, wherein said end portion is at an outer end of said extender portion that is distal from an inner end of said extender portion that is at the rear portion of the vehicle;

said end portion viewable to a viewer who is viewing the rear of the vehicle;

said end portion comprising at least one selected from the group consisting of (i) a vehicle emblem and (ii) a vehicle logo;

wherein said extender portion comprises a sidewall having a lower portion and an upper portion, and wherein said lower portion protrudes from the rear portion of the vehicle more than said upper portion protrudes from the rear portion of the vehicle;

a rear backup camera assembly at least partially disposed in said extender portion;

said rear backup camera assembly comprising a lens and a two dimensional array of a plurality of light sensing photosensor elements;

wherein said rear backup camera assembly is disposed with its lens viewing exterior of the vehicle;

wherein said lens of said rear backup camera assembly is disposed at said lower portion of said sidewall of said extender portion;

wherein said extender element is incapable of extending such that said rear backup camera is non-movable relative to the rear portion of the vehicle when disposed at the rear portion of the vehicle;

wherein said rear backup camera assembly comprises a CMOS color camera and wherein said CMOS color camera captures video images at least of an area immediately rearward of the vehicle;

wherein said extender element is at least partially formed of a polymeric material;

wherein the field of view of said rear backup camera assembly encompasses a rear part of the vehicle below said extender element so as to provide a reference for a driver of the vehicle when viewing video images captured by said rear backup camera assembly; and wherein said rear backup camera assembly is positioned at a central region at the rear of the vehicle.

2. The vehicle vision system of claim 1, wherein said extender element comprises part of an exterior trim element.

3. The vehicle vision system of claim 2, wherein said rear backup camera assembly is positioned above a rear license plate of the vehicle and wherein the rear part of the vehicle that is below said extender element and that is encompassed by the field of view of said rear backup camera assembly comprises a bumper.

4. The vehicle vision system of claim 3, wherein the rear portion of the vehicle comprises part of one of (i) a deck lid of the vehicle and (ii) a tailgate of the vehicle.

5. The vehicle vision system of claim 1, wherein said extender element comprises part of a rear tailgate handle.

6. The vehicle vision system of claim 5, wherein said rear backup camera assembly is positioned above a rear license plate of the vehicle and wherein the rear part of the vehicle that is below said extender element and that is encompassed by the field of view of said rear backup camera assembly comprises a bumper.

7. The vehicle vision system of claim 6, wherein the rear portion of the vehicle comprises part of a tailgate of the vehicle.

8. The vehicle vision system of claim 1, wherein said extender element comprises part of a deck lid handle.

9. The vehicle vision system of claim 8, wherein said rear backup camera assembly is positioned above a rear license plate of the vehicle and wherein the rear part of the vehicle that is below said extender element and that is encompassed by the field of view of said rear backup camera assembly comprises a bumper.

10. The vehicle vision system of claim 9, wherein the rear portion of the vehicle comprises part of a deck lid of the vehicle.

11. The vehicle vision system of claim 1, wherein said extender element comprises part of a light bar.

12. The vehicle vision system of claim 11, wherein said rear backup camera assembly is positioned above a rear license plate of the vehicle and wherein the rear part of the vehicle that is below said extender element and that is encompassed by the field of view of said rear backup camera assembly comprises a bumper.

13. The vehicle vision system of claim 12, wherein the rear portion of the vehicle comprises part of one of (i) a deck lid of the vehicle and (ii) a tailgate of the vehicle.

14. The vehicle vision system of claim 1, wherein said end portion has a shape and wherein said extender portion has a shape matching that of said end portion.

15. The vehicle vision system of claim 14, wherein said rear backup camera assembly protrudes outwardly relative to the rear portion of the vehicle through an opening at a lower part of said extender element.

16. The vehicle vision system of claim 15, wherein the rear part of the vehicle that is below said extender element and that is encompassed by the field of view of said rear backup camera assembly comprises a bumper.

17. The vehicle vision system of claim 16, wherein said extender portion comprises an elongated portion having a shape matching that of said end portion.

* * * * *